(12) United States Patent
Gast et al.

(10) Patent No.: US 7,885,597 B2
(45) Date of Patent: Feb. 8, 2011

(54) SCANNING A MEDIA STACK

(75) Inventors: David Gast, Camas, WA (US); Steven B. Elgee, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1952 days.

(21) Appl. No.: 10/829,438

(22) Filed: Apr. 20, 2004

(65) Prior Publication Data

US 2005/0231769 A1 Oct. 20, 2005

(51) Int. Cl.
G03G 15/00 (2006.01)
(52) U.S. Cl. ............... 399/389; 399/391; 399/393; 271/162; 271/9.05; 271/9.07; 271/9.08
(58) Field of Classification Search ............ 399/389, 399/391, 393; 355/408; 271/162, 9.07, 9.05, 271/9.08, 265.01; 428/192; 235/435, 487, 235/485
See application file for complete search history.

(56) References Cited

U.S. PATENT DOCUMENTS

| | | | |
|---|---|---|---|
| 3,679,876 A * | 7/1972 | Faith et al. .............. 235/435 |
| 4,660,820 A * | 4/1987 | Shino et al. ............. 271/9.08 |
| 5,053,814 A * | 10/1991 | Takano et al. ............ 399/23 |
| 5,085,417 A * | 2/1992 | Copham ................. 270/1.02 |
| 5,141,127 A * | 8/1992 | Graef et al. ................ 221/4 |
| 5,243,394 A * | 9/1993 | Matsuno et al. ........... 399/2 |
| 5,301,936 A * | 4/1994 | Matsumoto ............. 271/9.05 |
| 5,717,976 A * | 2/1998 | Chowdry et al. .......... 399/45 |
| 5,732,307 A * | 3/1998 | Yoshizuka et al. ......... 399/23 |
| 5,934,140 A | 8/1999 | Jackson et al. |
| 5,992,324 A * | 11/1999 | Rombult et al. .......... 101/477 |
| 6,002,906 A | 12/1999 | Hino et al. |
| 6,148,162 A | 11/2000 | Huston et al. |
| 6,236,815 B1 | 5/2001 | Kaneko et al. |
| 6,335,084 B1* | 1/2002 | Biegelsen et al. ......... 428/192 |
| 6,522,841 B2 | 2/2003 | Horikoshi |
| 6,546,210 B1* | 4/2003 | Nakamura ................ 399/12 |
| 6,577,826 B1 | 6/2003 | Misaizu et al. |
| 6,604,875 B2 | 8/2003 | Meunier et al. |
| 6,636,704 B2* | 10/2003 | Weaver et al. ............. 399/23 |
| 6,640,062 B2 | 10/2003 | Tsubaki et al. |
| 2002/0106209 A1 | 8/2002 | Niimura et al. |
| 2002/0164172 A1 | 11/2002 | Tsubaki et al. |
| 2003/0021610 A1 | 1/2003 | Shimizu et al. |
| 2003/0044189 A1 | 3/2003 | Okitsu et al. |
| 2003/0072019 A1 | 4/2003 | Haines et al. |
| 2003/0072922 A1 | 4/2003 | Haines |
| 2003/0076520 A1 | 4/2003 | Haines et al. |
| 2003/0095810 A1 | 5/2003 | Haines et al. |
| 2003/0095811 A1 | 5/2003 | Haines |
| 2003/0194251 A1 | 10/2003 | Maruyama et al. |

FOREIGN PATENT DOCUMENTS

| | | |
|---|---|---|
| DE | 3219784 A1 * | 12/1982 |
| JP | 05294483 A * | 11/1993 |
| JP | 8072286 A2 | 3/1996 |
| JP | 8194783 A2 | 7/1996 |
| JP | 10044512 A2 | 2/1998 |

* cited by examiner

Primary Examiner—Ren Yan
Assistant Examiner—Matthew G Marini

(57) ABSTRACT

An apparatus includes a tray, a sensor, and a transport mechanism. The tray holds a media stack. The transport mechanism moves the tray past the sensor to scan a side of the media stack.

25 Claims, 8 Drawing Sheets

SCANNING A MEDIA STACK

BACKGROUND

Imaging devices such as printers, plotters, copiers, facsimile machines, and the like, can utilize various types of media to print images. Such media types may include variously sized paper based media (e.g., glossy paper, semi-glossy paper, matte paper, etc.) as well as non-paper based media (e.g., vellum, film, etc.). To achieve a desired level of print quality when forming an image on media, an imaging device may use a number of imaging parameters that can vary according to the type of media being utilized. Operation of the imaging device may be adjusted based, at least in part, on these imaging parameters.

In some cases media type information and corresponding imaging parameter settings may be written on a media container or other packaging. However, many users do not read the packaging or any other instructions that accompany the media. In such cases, the user may rely either on memory or guess about the media type and/or corresponding imaging parameter settings. Additionally, for an imaging device capable of retrieving media from varying input sources and capable of adjusting operation based, at least in part, upon manual adjustment of imaging parameters related to media type a user may not remember the media types in the input sources.

DETAILED DESCRIPTION

Introduction: Imaging devices such as printers, copiers, and multi-function peripherals are capable of forming images on media of varying types. Such media types include variously sized paper based media (e.g., glossy paper, semi-glossy paper, matte paper, etc.) as well as non-paper based media (e.g., vellum, film, cloth, etc.). To achieve a desired level of print quality when forming an image on media of a particular type, an imaging device may allow for the configuration of a number of imaging parameters related to such things as media size and orientation, print resolution, print speed, color maps, and so on.

Figure 1:
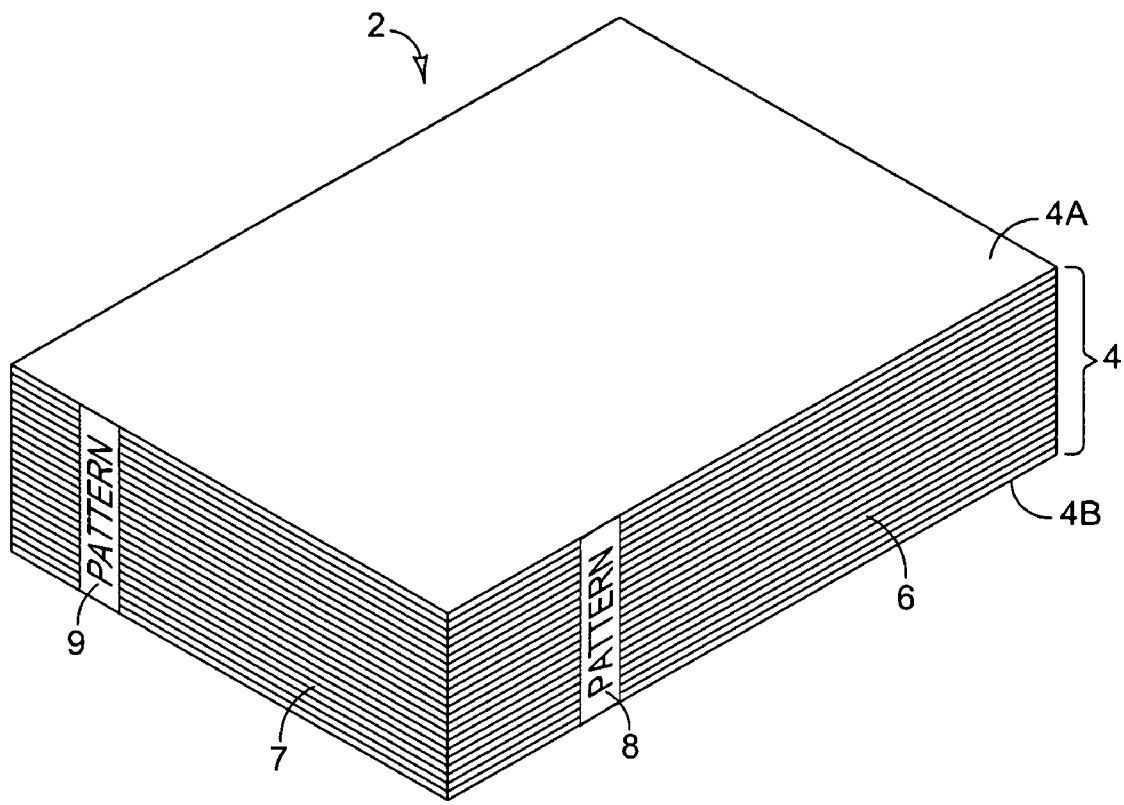
FIG. 1 illustrates an embodiment of a media stack having a pattern imprinted on its side.

Various embodiments of the present invention help reduce the amount of user interaction involved to configure imaging parameters with settings related to the type of media selected by or otherwise available to the user. To assist in this endeavor, a media stack of a given type is imprinted with a pattern. FIG. 1 shows a media stack 2 of sheets 4. Media stack 2 has opposing faces 4A and 4B joined by sides 6 and 7. Patterns 8 and 9 are imprinted on sides 6 and 7 respectively.

Patterns 8 and 9 each encode information corresponding to data, such as imaging data used for an image forming operation. Imaging data is any information that can be used, at least indirectly, to configure an imaging device. Patterns 8 and 9 may be bar codes or any other images capable of encoding information, Imaging data, for example might identify the type of media in media stack 2 and/or imaging parameter settings. For example, the information encoded by the pattern might directly identify the media type or include imaging parameter settings corresponding to the media type. Such parameter settings might affect print mode, color map selection, heater settings, number of passes under a dryer, vacuum, hold down pressure, and alignment offsets. Alternatively, the information encoded by the pattern might be a reference associated with imaging data. That reference might correspond to an entry in a look-up table containing the imaging data. Patterns 8 and 9 may encode the same or different imaging data.

As shown, patterns 8 and 9 span a height of media stack 2 extending from face 4A to face 4B. Here, the imaging data corresponding to patterns 8 and 9 may also include the number of sheets 4 expected to be found in media stack 2. Patterns 8 and 9 might also be a series of consecutive repeating or unique sub-patterns, where each sub-pattern is formed on a different subset of sheets 4 in media stack 2. Each sub-pattern would then encode information corresponding to imaging data for the sheets 4 on which the sub-pattern is formed. That imaging data may include an expected number of sheets 4 on which that sequence is formed.

Various embodiments of the present invention involve scanning pattern 8 or 9 once media stack 2 has been placed in an imaging device. The imaging device then deciphers the pattern to reveal the imaging data which it then uses to configure its own imaging parameters.

As an example, imagine that pattern 8 includes-three different consecutive sub-patterns. Imaging data corresponding to the first sub-pattern indicates that the sub-pattern is formed on twenty sheets of media type A. Imaging data corresponding to the second sub-pattern indicates that the sub-pattern is formed on twenty-five sheets of media type B. Imaging data corresponding to the third sub-pattern indicates that the sub-pattern is formed on ten sheets of media type C. Once pattern 8 is scanned, an imaging device can presume that media stack 2 contains fifty-five sheets 4. The imaging device can use imaging parameter settings for media type A for the first twenty sheets, imaging parameter settings for media type B for the next twenty-five sheets, and imaging parameter settings for media type C for the last ten sheets.

Figure 2:
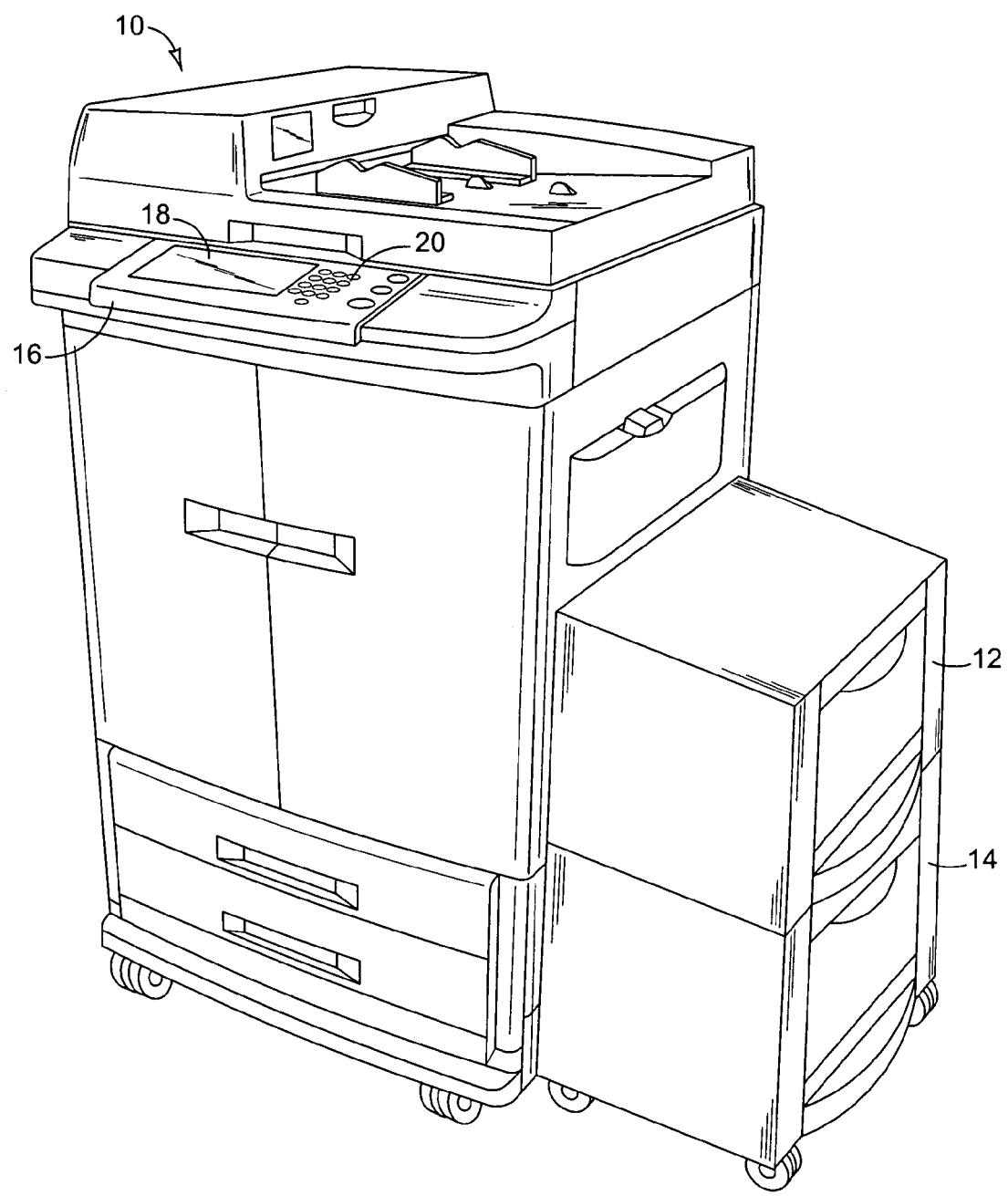
FIG. 2 is a perspective view of an embodiment of an imaging device having two media sources according to an embodiment of the present invention.

Environment: FIG. 2 illustrates an exemplary imaging device 10 in which various embodiments of the present invention can be implemented. Imaging device 10 is shown as a copier but is intended to represent generally any device capable of forming an image on media. Examples include laser printers, ink jet printers, facsimile machines, multifunction peripherals (MFPs), and commercial presses.

As shown, imaging device 10 includes media sources 12 and 14 and user interface 16. Media sources 12 and 14 are each responsible for holding and supplying a media stack. For example, a user might place a stack of standard letter sized paper in media source 12 and a stack of glossy photo quality paper in media source 14. A more detailed example of a media source and its operation is described below with reference to FIGS. 5-7.

User interface 16 includes screen 18 and keypad 20. Screen 18 allows for imaging device 10 to generate a display related to its operation. Where screen 18 is a touch screen, it also allows a user to input information and to select a desired media type as well as settings for various imaging parameters. Keypad 20 also allows for user input.

Figure 3:
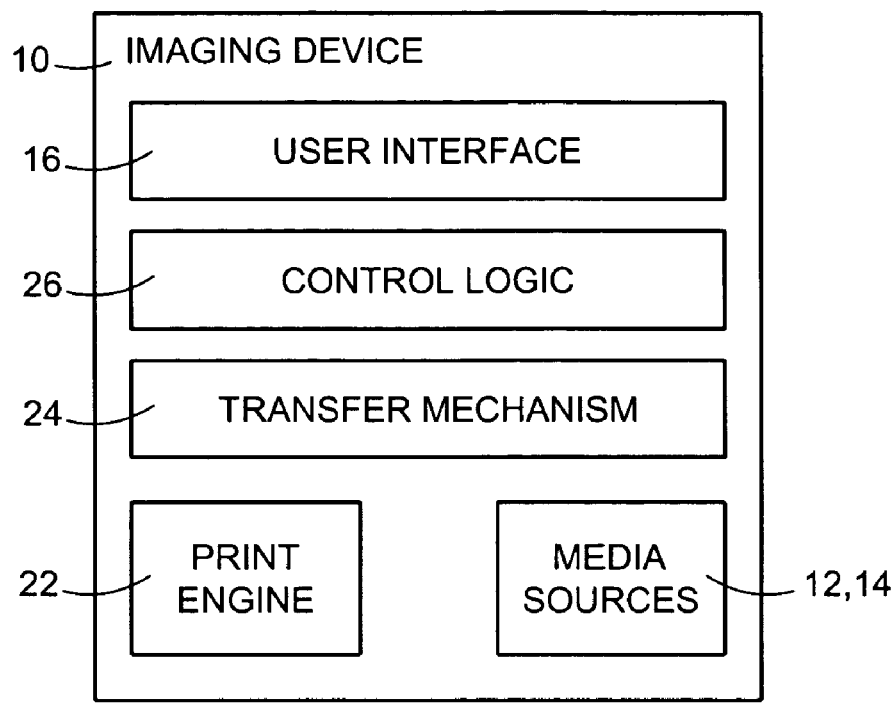
FIG. 3 is a block diagram showing the logical and physical components of the imaging device of FIG. 1 according to an embodiment of the present invention.
Figure 4:
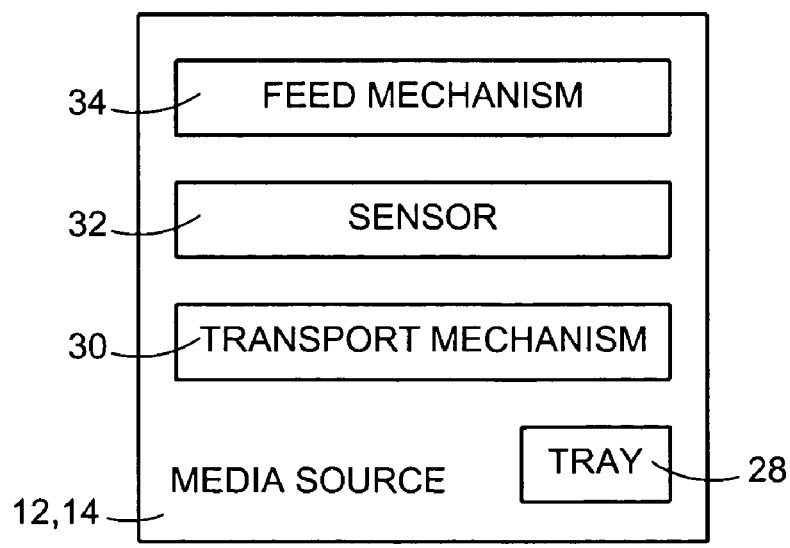
FIG. 4 is a block diagram showing the components of an embodiment of a media source according to an embodiment of the present invention.

Components: FIGS. 3 and 4 are exemplary block diagrams showing the physical and logical components of an exemplary implementation of the present invention within imaging device 10 (FIG. 1). Starting with FIG. 3, in addition to user interface 16 and media sources 12 and 14, imaging device 10 includes print engine 22, transfer mechanism 24, and control logic 26.

Print engine 22 represents hardware capable of forming an image on a sheet of media. Where, for example, imaging device 10 is a laser printer, print engine 22 might include an optical scanner, a photo conducting drum, toner and a fuser. The optical scanner modulates a laser beam across the drum. The scanned portions of the drum attract toner. Toner is transferred from the drum to a sheet of media forming the desired image. The fuser makes the toner transfer permanent.

Transfer mechanism 24 represents hardware capable of transferring a sheet of media through a print path (not shown) that passes through or adjacent to print engine 22. For example, transfer mechanism 24 might include a series of pinch rollers driven by one or more stepper motors. Rotation of the pinch rollers urges a sheet of media through the print path.

Control logic 26 represents hardware and programs capable of interacting with and directing the operation of media sources 12 and 14, transfer system 24, print engine 22, and user interface 16. For example, control logic is responsible for causing media source 12 or 14 to feed a sheet of media so that it can be accessed by transfer mechanism 24. Control logic 26 causes transfer mechanism 24 to transfer the sheet to print engine 22 while directing print engine 22 to form a desired image on the sheet.

Where imaging device 10 functions as a copier, it may also include a scanner (not shown) that in conjunction with control logic 26 is responsible for generating a digital representation of a physical image and using that digital representation to cause print engine 22 to form a copy of the physical image on a sheet of media. Where imaging device 10 is a printer, it may also include a data interface (not shown) enabling it to receive printing instructions from a desktop computer or other device.

FIG. 4 is an exemplary block diagram illustrating the components of media source 12, 14. Media source 12, 14 includes tray 28, transport mechanism 30, sensor 32, and feed mechanism 34. Tray 28 represents generally any moveable structure capable of supporting and holding a media stack. Transport mechanism 30 represents generally any mechanism capable of moving tray 28 between a first position in which a media stack can be placed on tray 28 and a second position in which a media sheet can be retrieved from the media stack and fed to transfer mechanism 24 (FIG. 3).

Sensor 32 is configured to scan the side of a media stack as transport mechanism 30 moves tray 28 between the first and second positions. Where the media stack has a pattern printed on its side, such as media stack 2 shown in FIG. 1, the side is scanned by sensor 32. Sensor 32 reads the pattern and transfers corresponding information to control logic 26 (FIG. 3). Sensor 32 may for example, be an optical sensor. Feed Mechanism 34 is configured to selectively retrieve a sheet of media from a media stack on tray 28 and feed that sheet to transfer mechanism 24 (FIG. 3).

To help reduce production costs, sensor 32 may be a stationary one bit optical sensor capable of directing a light beam toward a target surface on which a pattern is formed. The motion of the surface scans the pattern across the light beam. The one-bit optical sensor would also include a photo detector which detects light reflected or scattered from the pattern. This light is detected and converted into reflectance data. The reflectance data can be deciphered to identify imaging data.

Figure 5:
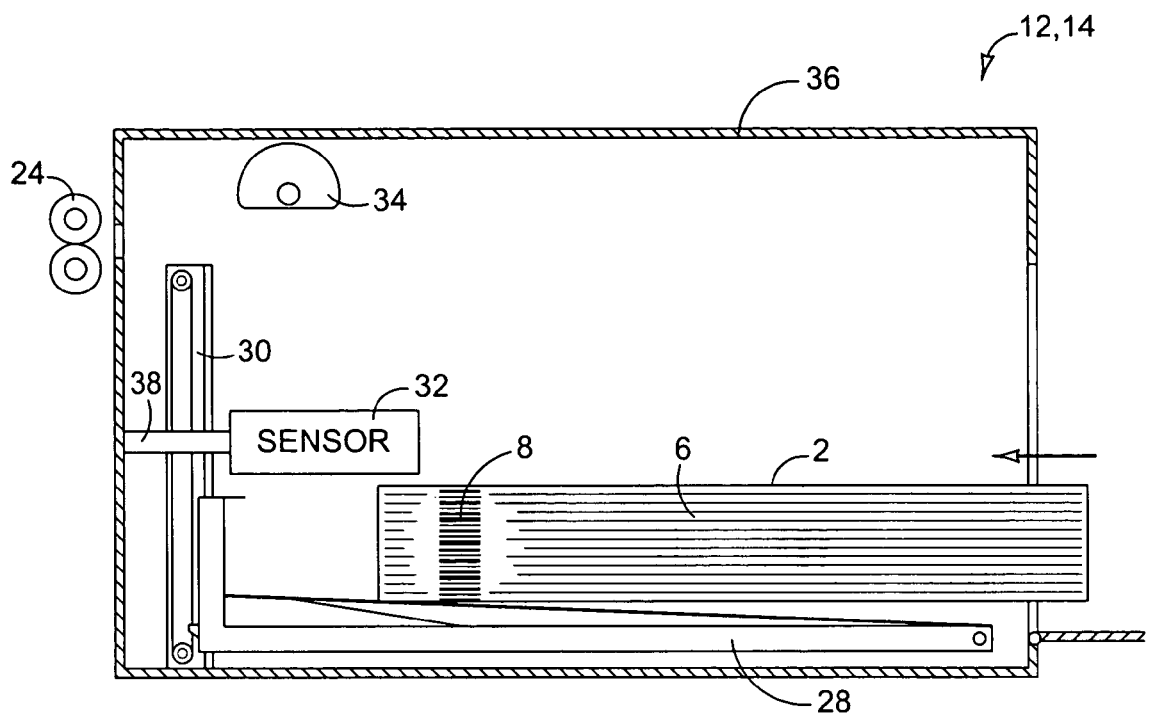
FIG. 5 is a partial view of a media source in which a tray is in a position allowing a media stack to be placed in the media source according to an embodiment of the present invention.
Figure 6:
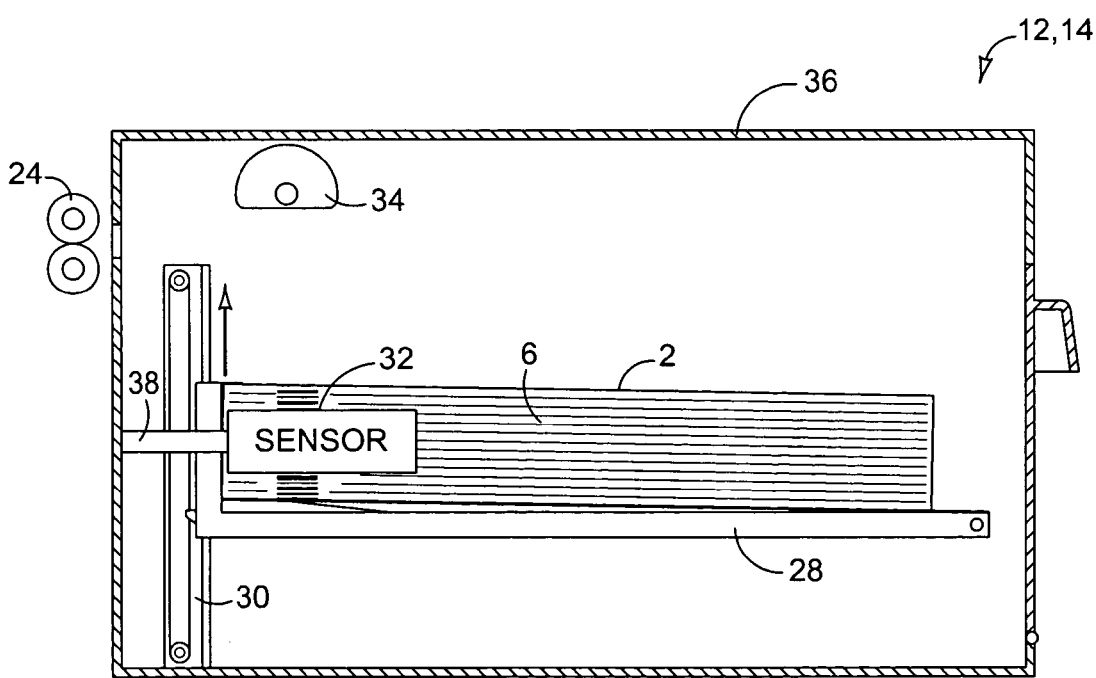
FIG. 6 is a partial view of a media source in which a tray is being shifted moving a media stack past a stationary sensor according to an embodiment of the present invention.
Figure 7:
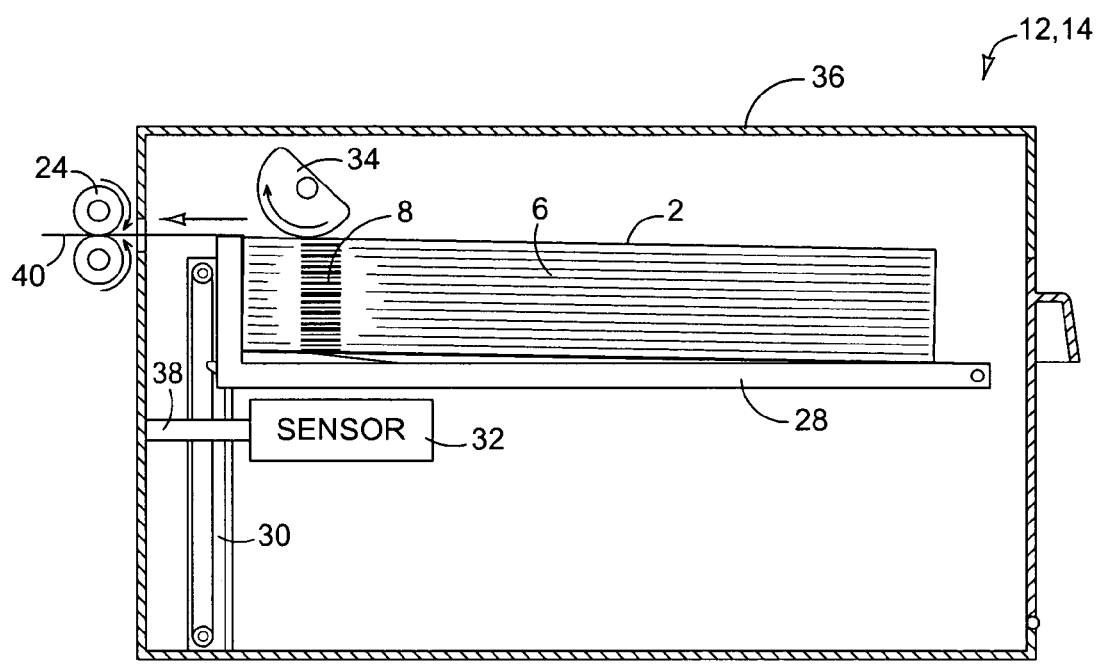
FIG. 7 is a partial view of a media source in which a tray is in a position so that a media stack can be accessed by an embodiment of a transfer mechanism according to an embodiment of the present invention.

FIGS. 5-7 are schematic views of media source 12, 14 in operation. Starting with FIG. 5, tray 28, transport mechanism 30, sensor 32, and feed mechanism 34 are contained within media source housing 36. Housing 36 is a structural shell that supports components 28-34. Media stack 2 is being placed on tray 28 which is being held in a first position by transport mechanism 30 within housing 36. Media stack 2 includes pattern 8 imprinted on side 6. Sensor 32 is coupled to housing 36 by support 38 such that the position of sensor 36 is fixed relative to housing 36.

Moving to FIG. 6, transport mechanism 30 is moving tray 28 and media stack 2 past sensor 32. The motion allows sensor 32 to scan side 6 of media stack 2 and to read pattern 8 which is now partially hidden behind sensor 32. In FIG. 7, transport mechanism 30 has moved tray 28 into a second position allowing feed mechanism 34 to feed media sheet 40 to transfer mechanism 24 to be transferred to print engine 22 (FIG. 3). Here, feed mechanism 34 is a pick roller rotationally driven by a stepper motor (not shown). Transfer mechanism 24 is shown as a pair of pinch rollers driven by the same or different stepper motor (not shown).

Figure 8:
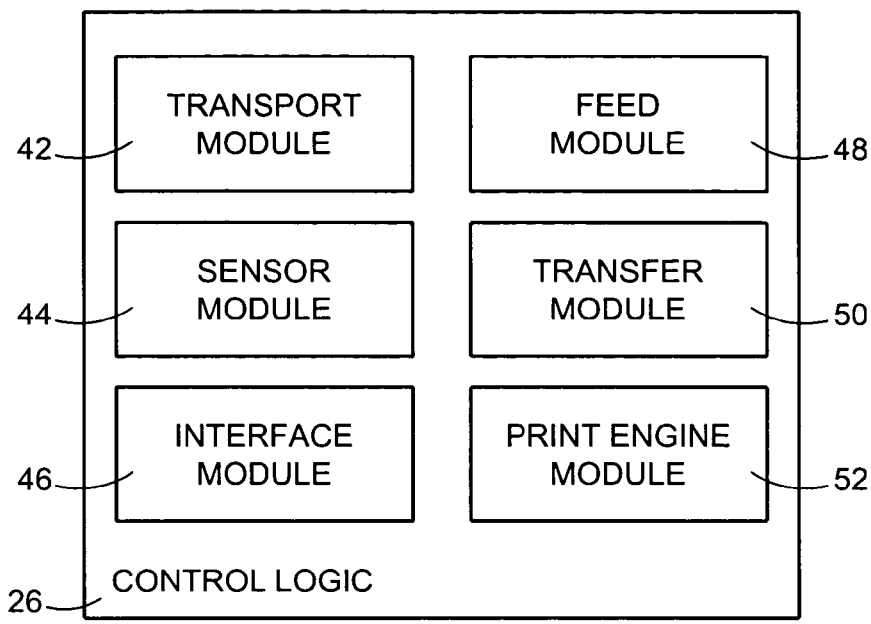
FIG. 8 is a block diagram showing embodiments of control logic components according to an embodiment of the present invention.

FIG. 8 is a block diagram illustrating the logical components of control logic 26 which is shown to include transport module 42, sensor module 44, interface module 46, feed module 48, transfer module 50, and print engine module 52. Modules 42-52 each represent a program or programs responsible for carrying out specified tasks. The following description of modules 42-52 makes reference to various other components of imaging, device 10 shown in FIGS. 3-7.

Transport module 42 instructs transport mechanism 30 to move tray 28. Sensor module 44 instructs sensor 32 to scan a side of a media stack as transport mechanism 30 moves tray 28 and to read a pattern imprinted on the side of the media stack. Sensor module 44 is also responsible for deciphering the pattern to identify or otherwise reveal data, such as imaging data, encoded or referenced by the pattern. As noted earlier, in one embodiment a pattern might include a consecutive series of repeating or unique sub-patterns. In such a case, sensor module 44 is also responsible for deciphering each sub-pattern to identify or otherwise reveal the imaging data encoded or referenced by that sub-pattern.

Interface module 46 instructs user interface 16 to generate a display or otherwise convey information corresponding to the imaging data. For example, user interface 16 might alert a user to the type of media contained in media source 12 and/or 14. User interface 16 might also alert a user as to one or more imaging parameter settings for the media contained in media source 12 and/or 14. User interface 16 might also keep a running count and alert the user to the number of sheets of each type of media contained in media source 12 and/or 14.

Feed module 48 instructs feed mechanism 34 to feed a sheet of media to transfer mechanism 24. Transfer module 50 instructs transfer mechanism 24 to transfer the sheet on to print engine 22. Print engine module 52 controls the operating of print engine 22 instructing print engine 22 to form an image on a sheet of media supplied from a particular media source 12 or 14 according to the imaging data deciphered by sensor module 44 for that media source 12 or 14. For example, where the imaging data references or includes imaging parameter settings, print engine module 52 instructs print engine 22 according to those imaging parameter settings. Where imaging data includes or references a media type, print engine module 52 instructs print engine 22 according to imaging parameter settings for that media type.

As shown in FIG. 2, imaging device 10 includes multiple media sources 12 and 14. Each media source 12 and 14 includes its own tray, 28, transport mechanism 30, sensor 32, and feed mechanism 34. In this case, transport module 42, sensor module 44, and feed module 48 are responsible for selectively instructing the respective components of both media sources 12 and 14. Alternatively, control logic 26 might instead include duplicate transport, sensor, and feed modules where each set of modules is responsible for instructing the respective components of a given media source 12 or 14.

Still referring to FIG. 2, assume that media stacks of differing types have been inserted in media sources 12 and 14 and that sensor module 44 has deciphered patterns imprinted on each stack revealing first imaging data corresponding to the media in media source 12 and second imaging data corresponding to media in media source 14. When media is retrieved from media source 12, print engine module 52 instructs print engine 22 to form an image on that sheet according to the first imaging data. Conversely, when media is retrieved from media source 14, print engine module 52 instructs print engine 22 to form an image on that sheet according to the second imaging data. In other words, print engine module 52 is configured to instruct print engine 22 to form an image on a sheet of media according to imaging data that corresponds to the media source 12 or 14 from which the sheet was retrieved.

Figure 9:
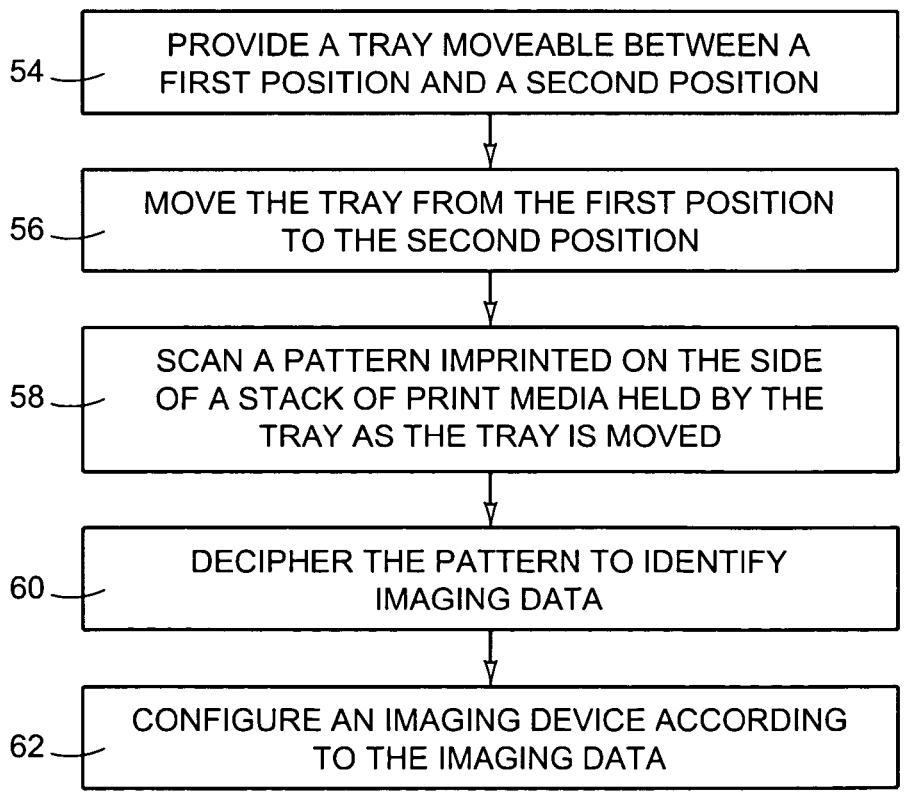
FIG. 9 is an exemplary flow diagram illustrating steps taken to configure an embodiment of an imaging device according to an embodiment of the present invention.
Figure 10:
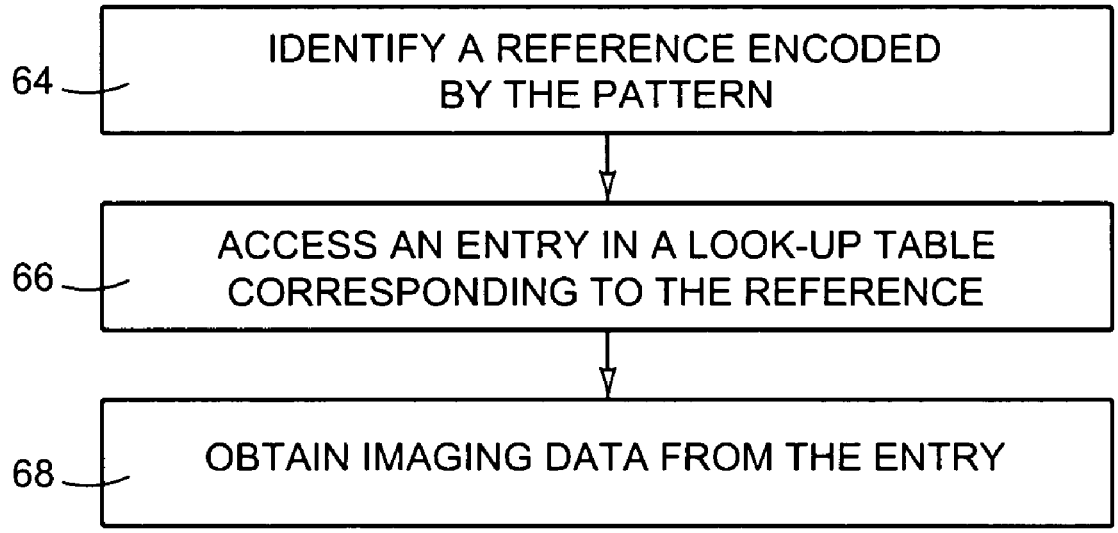
FIG. 10 is an exemplary flow diagram illustrating steps taken to obtain imaging data from a look-up table according to an embodiment of the present invention.
Figure 11:
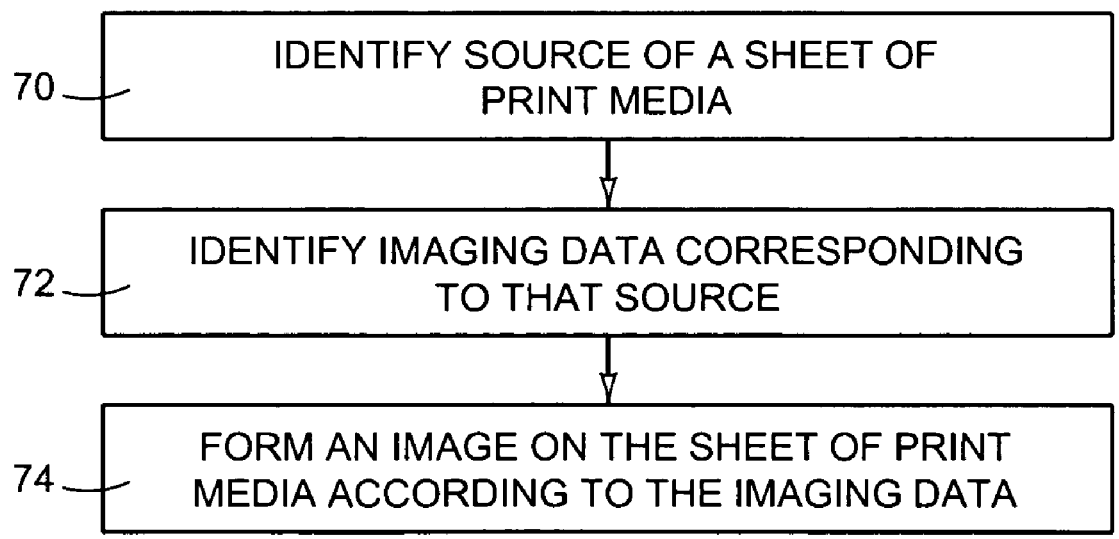
FIG. 11 is an exemplary flow diagram illustrating steps taken to configure an embodiment of an imaging device based upon the source of a sheet of media according to an embodiment of the present invention.
Figure 12:
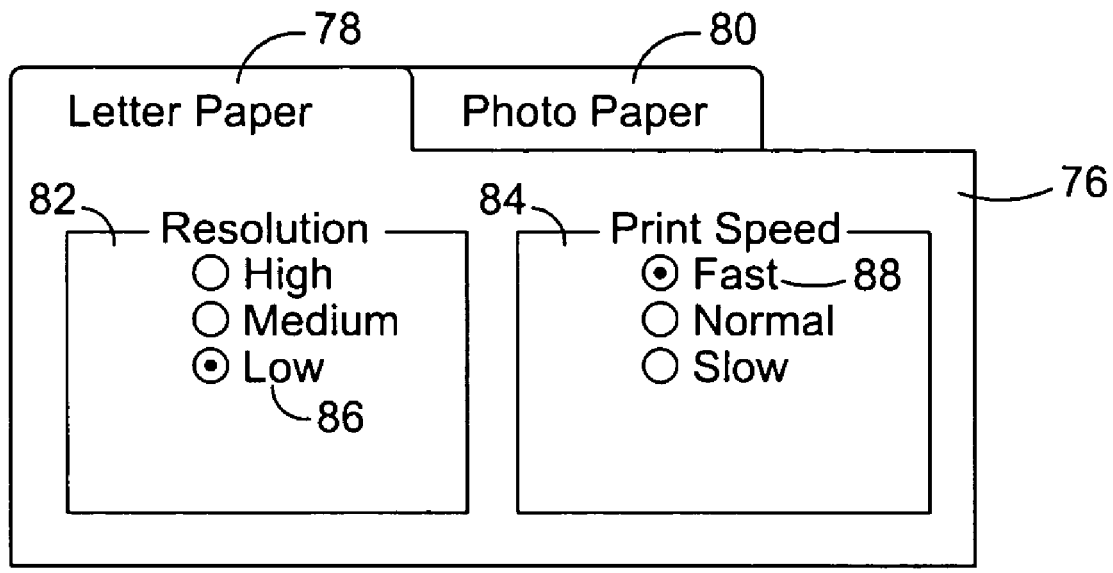
FIGS. 12 and 13 are exemplary screen displays provided by an embodiment of an imaging device that has been configured according to an embodiment of the present invention.
Figure 13:
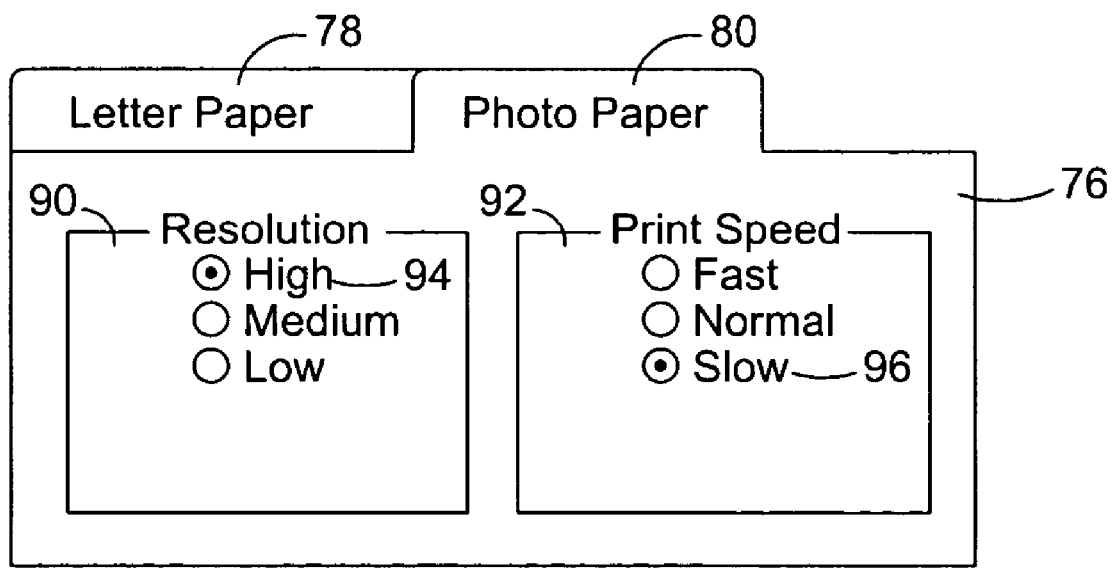

Operation: The operation of various embodiments of the present invention will now be described with reference to FIGS. 9-13. FIGS. 9-11 are exemplary flow diagrams illustrating steps taken to implement various embodiments of the present invention. FIGS. 12 and 13 are exemplary screen displays shown by a user interface of an imaging device according to an embodiment of the present invention.

FIG. 9 illustrates steps taken to identify imaging data corresponding to a media stack and to configure an imaging device accordingly. A tray, moveable between a first position and a second position, is provided (step 54). The tray is configured to hold a media stack. With the tray held in the first position, the media stack can be placed on the tray. When placed in the second position, a sheet from the media stack can be retrieved. Tray 28 in FIGS. 5-7 provides an example.

The tray is moved from the first position to the second position (step 56). As the tray is moved, a pattern imprinted on the side of the media stack is scanned (step 58). The pattern is deciphered to identify imaging data (step 60). The pattern, for example, may encode the imaging data or it may encode a reference that can be used to access the imaging data. The imaging data might identify a media type and/or it might include one or more imaging parameter settings. Where the pattern encodes a reference, that reference could, for example, identify a media type, and that media type could be used to access or otherwise identify associated imaging parameter settings. Moreover, the pattern may include a consecutive series of repeating or unique sub-patterns. Step 60 then involves deciphering each sub-pattern to identify imaging data for that sub-pattern.

The imaging data is then used to configure an imaging device (step 62). Configuration can take a number of forms. For example, step 62 may involve storing the imaging data. It may involve forming an image according to imaging parameter settings included in or referenced by the imaging data. It may also involve causing a user interface to generate a display related to the imaging data.

FIG. 10 expands on step 60 of FIG. 9 where the pattern encodes a reference that can be used to access imaging data. Initially, the reference encoded by the pattern is identified (step 64). An entry in a look-up table corresponding to the reference is accessed (step 66). Imaging data is obtained from the entry (step 68).

Referring back to FIG. 8, step 64 may, for example, be performed by sensor module 44. Steps 66 and 68 may be performed by sensor module 44, interface module 46 and/or print engine module 52. As an example, once sensor module 44 identifies a reference encoded by the pattern in step 64, sensor module 44 or print engine module 52 might store the reference so that it is associated with a particular media source. When an image is to be formed on a sheet of media retrieved from that source, print engine module 52 may acquire the reference, access an entry in a look-up table associated with the reference in step 66, obtain imaging data from that entry in step 68, and use the imaging data to guide the formation of an image on the sheet of media in step 62 (FIG. 9).

In another example, once sensor module 44 identifies a reference encoded by the pattern in step 64, sensor module 44 or interface module 46 might store the reference so that it is associated with a particular media source, such as media source 12 or 14 of FIGS. 2-7. Interface module 46 may acquire the reference, access an entry in a look-up table associated with the reference in step 66, obtain imaging data from that entry in step 68, and configure an imaging device in step 62 (FIG. 9) by causing a user interface to display information corresponding to the imaging data.

FIG. 11 expands on step 62 of FIG. 9 and illustrates an example of steps taken to configure an imaging device. Imagine that a user has instructed an imaging device to form an image on a sheet of media. In response, the imaging device retrieves a sheet of media. The source of the sheet of media is identified (step 70). Referring to FIGS. 2-7, for example, that sheet of media may have been retrieved from media source 12 or media source 14. Imaging data corresponding to media supplied from that media source is identified (step 72). An image is formed on the sheet according to the imaging data (step 74).

As noted earlier, configuring an imaging device can involve causing a user interface to generate a display related to imaging data. FIGS. 12 and 13 provide examples of such a user interface screen display 76. Starting with FIG. 12, screen display 76 includes tabs 78 and 80. Each tab 78 and 80 corresponds to a media source available to an imaging device. Based on imaging data for each media source, tab 78 is shown to correspond to a media source currently supplying a stack of standard letter sized sheets of media. Tab 80 is shown to correspond to a media source currently supplying a stack of sheets of high quality photo paper.

In FIG. 12, tab 78 has been selected revealing imaging parameters 82 and 84. Imaging parameter 82 controls print resolution while imaging parameter 84 controls print speed. Imaging data corresponding to the letter sized media include parameter settings 86 and 88 that specify a low print resolution and a fast print speed, respectively.

In FIG. 13, tab 80 has been selected revealing imaging parameters 90 and 92. Imaging parameter 90 controls print resolution while imaging parameter 92 controls print speed. Imaging data corresponding to the photo paper media include parameter settings 94 and 96 that specify a high print resolution and a slow print speed, respectively.

Conclusion: The diagrams of FIGS. 3-8 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may represent a circuit or a number of interconnected circuits to implement the specified logical function(s).

Also, embodiments of the present invention can be implemented in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 9-11 show specific orders of execution, the orders of execution may differ from that which are depicted. For example, the order of execution of two or more blocks may be scrambled relative to the order shown. Also, two or more blocks shown in succession may be executed concurrently or with partial concurrence. All such variations are within the scope of the claimed subject matter. The exemplary screen displays of FIGS. 12 and 13 are just that—examples. There exist may other ways to display information corresponding to imaging data, all of which fall within the scope of the claimed subject matter.

Embodiments of the present invention have been shown and described. It is to be understood, however, that other forms, details and embodiments may be made without departing from the spirit and scope of the invention that is defined in the following claims.

What is claimed is:

1. An apparatus, comprising:
   a tray for holding a media stack, the media stack having opposing faces joined by sides, a pattern being formed on at least one of the sides, each face being a face of a media sheet, the pattern including a plurality of sub-patterns, each sub-pattern being formed on a different subset of sheets in the media stack and encoding imaging data or a reference associated with the imaging data for the subset of sheets on which the sub-pattern is formed, the imaging data for at least one subset of sheets identifying an expected number of sheets in that subset;
   a sensor;
   a transport mechanism to move the tray past the sensor to scan the sub-patterns; and
   control logic operable to communicate with the sensor to decipher the imaging data from the sub-patterns for each subset of sheets in the media stack.

2. The apparatus of claim 1, further comprising a housing and wherein
   the sensor is coupled to the housing such that the sensor is held stationary relative to the housing; and
   the transport mechanism is coupled to the housing and the tray.

3. A media source, comprising:
   a tray for holding a media stack, the media stack having opposing faces joined by sides, a pattern being formed on at least one of the sides, each face being a face of a media sheet, the pattern including a plurality of sub-patterns, each sub-pattern being formed on a different subset of sheets in the media stack and encoding imaging data or a reference associated with the imaging data for the subset of sheets on which the sub-pattern is formed, the imaging data for at least one subset of sheets identifying an expected number of sheets in that subset;
   a transport mechanism operable to move the tray between a first position in which the media stack can be loaded onto the tray and a second position in which a sheet from the media stack loaded onto the tray can be fed into a print path of an imaging device;
   a sensor positioned so that it can scan the sub-patterns as the transport mechanism moves the tray between the first and second positions; and
   control logic operable to communicate with the sensor to decipher the imaging data from the sub-patterns for each subset of sheets in the media stack.

4. The media source of claim 3, further comprising a support holding the sensor stationary relative to the motion of the tray caused by the transport mechanism.

5. The media source of claim 3, wherein the tray, the transport mechanism, and the sensor are components of the imaging device.

6. A media source, comprising:
   a tray for holding a media stack, the media stack having opposing faces joined by sides, a pattern being formed on at least one of the sides, each face being a face of a media sheet, the pattern including a plurality of sub-patterns, each sub-pattern being formed on a different subset of sheets in the media stack and encoding imaging data or a reference associated with the imaging data for the subset of sheets on which the sub-pattern is formed, the imaging data for at least one subset of sheets identifying an expected number of sheets in that subset;
   means for moving the tray between a first position and a second position;
   means for scanning the sub-patterns as the tray is moved between the first position and the second position; and
   a means for deciphering the imaging data from the sub-patterns for each subset of sheets in the media stack.

7. The media source of claim 6, wherein:
   the media stack can be loaded onto the tray when the tray is in the first position; and
   a sheet form the media stack can be fed into a print path of an imaging device when the tray is in the second position.

8. The media source of claim 6, wherein the means for scanning include means for scanning the at least one side of the media stack as the tray is moved between the first position and the second position.

9. A data identification system, comprising:
a tray for holding a media stack, the media stack the media stack having opposing faces joined by sides, a pattern being formed on at least one of the sides, each face being a face of a media sheet, the pattern including a plurality of sub-patterns, each sub-pattern being formed on a different subset of sheets in the media stack and encoding imaging data or a reference associated with the imaging data for the subset of sheets on which the sub-pattern is formed, the imaging data for at least one subset of sheets identifying an expected number of sheets in that subset;
a transport mechanism operable to move the tray between a first position and a second position;
a sensor positioned to scan the sub-patterns as the transport mechanism moves the tray between the first position and the second position; and
logic coupled to the sensor and operable to decipher the imaging data from the sub-patterns for each subset of sheets in the media stack.

10. The data identification system of claim 9, wherein:
the media stack can be loaded onto the tray when the tray is in the first position; and
a sheet from the media stack can be fed into a print path of an imaging device when the tray is in the second position.

11. The data identification system of claim 9, further comprising a support holding the sensor stationary relative to the motion of the tray caused by the transport mechanism.

12. The data identification system of claim 9, wherein each sub-pattern encodes a reference and the control logic is operable to retrieve, for each reference, an entry in a look-up table associated with the reference, the entry including the imaging data for a given sub-pattern.

13. The data identification system of claim 9, wherein the imaging data for a given sub-pattern includes parameter settings for a corresponding subset of sheets, and the control logic is operable to decipher the given sub-pattern to identify the parameter settings.

14. The data identification system of claim 9, wherein the imaging data for a given sub-pattern includes a media type for a corresponding subset of sheets, and the control logic is operable to decipher the given sub-pattern to identify the media type.

15. The data identification system of claim 14, wherein the control logic is operable to select parameter settings for the corresponding subset of sheets according to the media type.

16. The data identification system of claim 9, wherein the tray, the transport mechanism, the sensor, and the control logic are components of an imaging device.

17. The data identification system of claim 9, wherein the imaging data for each sub-pattern includes an expected number of sheets of media in a corresponding subset of sheets on which the sub-pattern is imprinted, and the control logic is operable to decipher the sub-patterns to identify the expected number of sheets in the media stack.

18. An imaging device, comprising:
a print engine operable to form an image on a sheet of media;
a media source operable to supply a media stack, the media source including:
a tray for holding the media stack, the media stack having opposing faces joined by sides, a pattern being formed on at least one of the sides, each face being a face of a media sheet, the pattern including a plurality of sub-patterns, each sub-pattern being formed on a different subset of sheets in the media stack and encoding imaging data or a reference associated with the imaging data for the subset of sheets on which the sub-pattern is formed, the imaging data for at least one subset of sheets identifying an expected number of sheets in that subset;
a transport mechanism operable to move the tray between a first position and a second position;
a sensor positioned to scan the sub-patterns as the transport mechanism moves the tray between the first position and the second position;
a transfer mechanism operable to transfer sheets of media from the media source to the print engine;
control logic in communication with the media source, the print engine, and the transfer mechanism, the control logic operable to decipher the imaging data from the sub-patterns for each subset of sheets in the media stack and to control the operation of the print engine with respect to each subset of sheets according to the imaging data for that subset of sheets.

19. The imaging device of claim 18, wherein:
the media stack can be loaded onto the tray when the tray is in the first position; and
a sheet from the media stack can be supplied to the print engine when the tray is in the second position.

20. The imaging device of claim 18, further comprising a user interface in communication with the control logic and wherein the control logic is operable to cause the user interface to generate a display corresponding, at least indirectly, to the imaging data for one or more of the subsets of sheets.

21. The imaging device of claim 20, wherein the control logic is operable to cause the user interface to generate a display that includes user selectable options corresponding, at least indirectly, to the imaging data for one or more of the subsets of sheets.

22. The imaging device of claim 18, wherein the imaging data for a given sub-pattern includes imaging parameter settings, the imaging device further comprising a user interface in communication with the control logic and capable of displaying information to a user and wherein the control logic is operable to cause the user interface to display information corresponding to the imaging parameter settings the subset of sheets on which the given sub-pattern is imprinted.

23. The imaging device of claim 18, wherein the imaging data for each sub-pattern includes an expected number of sheets of media in a corresponding subset of sheets on which the pattern is imprinted, the imaging device further comprising a user interface in communication with the control logic and wherein the control logic is further operable to cause the user interface to generate a display corresponding, at least indirectly, to the expected number of sheets in the media stack.

24. An imaging device, comprising:
a print engine operable to form an image on a sheet of media;
a first media source operable to supply a first media stack, the first media source including:
a first tray for holding the first media stack, the first media stack having opposing faces joined by sides, a first pattern being formed on at least one of the sides, each face being a face of a media sheet, the first pattern including a plurality of first sub-patterns, each first sub-pattern being formed on a different subset of sheets in the first media stack and encoding imaging data or a reference associated with the imaging data for the subset of sheets on which the first sub-pattern is formed, the imaging data for at least one subset of sheets in the first media stack identifying an expected number of sheets in that subset;

a first transport mechanism operable to move the first tray between a first position and a second position;

a first sensor positioned to scan the first sub-patterns as the first transport mechanism moves the first tray between the first position and the second position;

a second media source operable to supply a second media stack, the second media source including:

a second tray for holding the second media stack, the second media stack having opposing faces joined by sides, a second pattern being formed on at least one of the sides, each face being a face of a media sheet, the second pattern including a plurality of second sub-patterns, each second sub-pattern being formed on a different subset of sheets in the second media stack and encoding imaging data or a reference associated with the imaging data for the subset of sheets on which the second sub-pattern is formed, the imaging data for at least one subset of sheets in the second media stack identifying an expected number of sheets in that subset;

a second transport mechanism operable to move the second tray between a third position and a fourth position;

a second sensor positioned to scan the second sub-patterns as the second transport mechanism moves the second tray between the third position and the fourth position;

a transfer mechanism operable to transfer sheets of media from the first and second media sources to the print engine;

control logic in communication with the first and second media sources, the print engine, and the transfer mechanism, the control logic operable to decipher the first and second sub-patterns to identify imaging data for each of the first subsets of sheets in the first media stack and second media data for each of the second subsets of sheets in the second media stack and to control the operation of the transfer mechanism and to control the operation of the print engine so that the first imaging data for a given one of the subsets of sheets in the first media stack is used when a media sheet from that given subset of sheets from the first media stack is transferred from the first media source and the second imaging data for a given one of the subsets of sheets in the second media stack is used when a media sheet from that given subset of sheets from the second media stack is transferred from the second media source.

25. The image forming device of claim 24, further comprising a user interface in communication with the control logic, wherein the control logic is operable to cause the user interface to generate a display corresponding, at least indirectly, to the imaging data for the subsets of sheets in the first and second media stacks.

* * * * *

UNITED STATES PATENT AND TRADEMARK OFFICE
CERTIFICATE OF CORRECTION

| | | |
|---|---|---|
| PATENT NO. | : 7,885,597 B2 | Page 1 of 1 |
| APPLICATION NO. | : 10/829438 | |
| DATED | : February 8, 2011 | |
| INVENTOR(S) | : David Gast et al. | |

It is certified that error appears in the above-identified patent and that said Letters Patent is hereby corrected as shown below:

In column 9, lines 6-7, in Claim 9, after "the media stack" delete "the media stack".

Signed and Sealed this
Second Day of August, 2011

David J. Kappos
*Director of the United States Patent and Trademark Office*